US006190562B1

(12) United States Patent
Kulprathipanja et al.

(10) Patent No.: US 6,190,562 B1
(45) Date of Patent: Feb. 20, 2001

(54) METHOD FOR TREATING A LIQUID STREAM CONTAMINATED WITH AN IODINE-CONTAINING COMPOUND USING A CATION-EXCHANGED CRYSTALLINE MANGANESE PHOSPHATE

(75) Inventors: Santi Kulprathipanja, Inverness; Gregory J. Lewis, Mt. Prospect; Richard R. Willis, Cary, all of IL (US)

(73) Assignee: UOP LLC, Des Plaines, IL (US)

( * ) Notice: Under 35 U.S.C. 154(b), the term of this patent shall be extended for 0 days.

(21) Appl. No.: 09/275,198

(22) Filed: Mar. 24, 1999

(51) Int. Cl.⁷ ..................................................... B01D 15/00
(52) U.S. Cl. ........................ 210/670; 210/679; 210/683; 210/690; 562/608
(58) Field of Search ..................................... 210/670, 679, 210/683, 690, 691; 562/608

(56) References Cited

U.S. PATENT DOCUMENTS

| 3,658,467 | 4/1972 | Maeck ........................ 23/25 |
| 3,702,886 | 11/1972 | Argauer et al. ...................... 423/328 |
| 3,769,329 | 10/1973 | Paulik et al. .......................... 260/488 |
| 4,088,737 | 5/1978 | Thomas et al. ...................... 423/240 |
| 4,615,806 | 10/1986 | Hilton .................................. 210/690 |
| 4,735,786 | 4/1988 | Inoue et al. .......................... 423/240 |
| 4,913,850 | 4/1990 | Puppe et al. .......................... 252/630 |
| 5,075,084 | 12/1991 | Wilhelm et al. ...................... 423/241 |
| 5,220,058 | 6/1993 | Fish et al. ............................ 210/665 |
| 5,227,524 | 7/1993 | Jones .................................. 562/608 |
| 5,300,685 | 4/1994 | Scates et al. ......................... 210/665 |
| 5,344,976 | 9/1994 | Jones et al. .......................... 562/608 |
| 5,457,230 | 10/1995 | Yang et al. .......................... 562/608 |
| 5,705,078 * | 1/1998 | Kurek et al. ......................... 210/904 |
| 5,780,003 * | 7/1998 | Lewis .................................. 502/208 |
| 5,801,279 | 9/1998 | Miura et al. ......................... 562/608 |
| 6,007,724 * | 12/1999 | Kulprathipanja et al. ........... 210/679 |

\* cited by examiner

*Primary Examiner*—Ivars Cintins
(74) *Attorney, Agent, or Firm*—John G. Tolomei; Frank S. Molinaro; Benjamin C. Spehlmann

(57) ABSTRACT

For the removal of trace quantities of iodine-containing contaminants from corrosive liquid feed streams, an alternative with distinct advantages over the prior art is provided. The treatment method involves the use of a crystalline manganese phosphate which has been cation-exchanged with an iodine-reactive metal. This inorganic adsorbent may be used in unbound form, or it can bound with a substantially insoluble porous inorganic refractory metal oxide binder. A reactivation technique for this material is also presented.

9 Claims, No Drawings

METHOD FOR TREATING A LIQUID STREAM CONTAMINATED WITH AN IODINE-CONTAINING COMPOUND USING A CATION-EXCHANGED CRYSTALLINE MANGANESE PHOSPHATE

FIELD OF THE INVENTION

The present invention relates to a novel method for treating a liquid stream contaminated with an iodine-containing compound using a solid adsorbent material. The adsorbent material comprises a crystalline manganese phosphate which has been cation exchanged with a metal selected from the group consisting of silver, mercury, copper, lead, thallium, palladium, or mixture thereof.

BACKGROUND OF THE INVENTION

Methanol carbonylation, the reaction of methanol with carbon monoxide, is used to produce a significant share of the world's acetic acid and represents the basis for virtually all new acetic acid capacity. The fundamental process, whereby methanol and carbon monoxide are reacted in the presence of a rhodium catalyst and methyl iodide promoter, is disclosed in U.S. Pat. No. 3,769,329 and has become well-known as the "Monsanto process". Although numerous improvements have since been developed, the use of an iodine-containing promoter, either as an organic iodide or metal iodide salt, has proven necessary to obtain industrially-competitive reaction rates and production economies.

Unfortunately, the use of any suitable iodine-containing promoter invariably results in the incorporation of trace iodine and organic iodide impurities into the final acetic acid product. These contaminants result from numerous transformations (thermal cracking, recombination, isomerization, etc.) of the iodine-containing catalyst promoters which occur not only in the reactor but also in downstream equipment, such as distillation column reboilers and recycle lines. A resulting array of $C_1$ to $C_{10}$ organic alkyl iodide species is produced, which are removed from the acetic acid product with varying degrees of effectiveness via the standard distillation steps used in downstream purification. Additionally, iodine may be present in the acetic acid product in the form of hydrogen iodide or iodide salts. Ultimately, without supplemental treatment to remove trace iodine-containing contaminants, product acetic acid made using methanol carbonylation technology with even the most careful fractionation steps, will still contain a small amount, typically below 100 parts per billion (ppb) of total iodine (both organic and inorganic) by weight.

The interest in a process for essentially complete removal of iodine-containing contaminants from acetic acid stems from the large share (about 40 to 50%) of its use as a precursor for vinyl acetate monomer (VAM) synthesis. Current methods of VAM production rely on a catalyst which is intolerant to even minute levels of iodine-containing compounds in the acetic acid feedstock. Therefore, the VAM production costs associated with reduced catalyst life increase dramatically with increasing feed iodine concentration.

Several disclosures in the prior art present techniques for the selective removal of iodine-containing species from process streams such as nuclear reactor containment environment off gases as well as emissions from spent nuclear fuel reprocessing operations. For example, U.S. Pat. No. 3,658,467 addresses the removal of radioactive iodine-containing materials from the gaseous waste streams generated either during normal nuclear fuel reprocessing operations or even in the event of a fuel element cladding failure whereby radioactive methyl iodide is formed in significant amounts. The solution proposed in the '467 patent is a zeolite X molecular sieve exchanged with silver for treating the gaseous waste stream. All cited examples referring to the adsorptive ability of this formulation are based on performance in a dry air stream contaminated with trace radioactive methyl iodide. The structures of X-type zeolites are known to have aluminosilicate frameworks with maximum silica to alumina molar ratios, expressed as the ratio of $SiO_2$ to $Al_2O_3$ in the fundamental zeolite framework, of about 3 and pore openings typically in the range of 7 to 8 Å.

In U.S. Pat. No. 4,735,786, an alternate solution for filtering radioactive iodine-containing compounds from nuclear facility exhaust gases in the event of an accident is proposed. In offering an improvement over the prior art, the '786 patent recognizes the practical deficiencies of silver-exchanged zeolite X adsorbent for this service under high humidity conditions. The improvement offered is a different type of adsorbent, characterized as a high silica to alumina molar ratio pentasil zeolite. The adsorbent specified is exemplified by the well-known ZSM-5 type material, which is clearly described in U.S. Pat. No. 3,702,886 as having ten-member rings forming medium-sized pores in the range of 5.1 to 5.6 Å. The teachings and specific examples of the '786 patent are restricted to pentasil zeolites having silica to alumina molar ratios in the range of 15 to 100, preferably 20 to 50.

In U.S. Pat. No. 4,913,850, another solution for methyl iodide removal from gaseous streams is presented, whereby a silver-exchanged "binderless" zeolite material, composed of 80 to 90% zeolite X and 10 to 20% zeolite A, is used. Among the possible candidates for zeolite X materials, those having the faujasite structure are of particular interest. As mentioned previously, zeolite X formulations generally have a maximum silica to alumina molar ratio of 3. In U.S. Pat. No. 5,075,084, the progress of treating radioactive iodine-containing gas streams is continued, where the problem of the proposed silver-exchanged zeolite material catalyzing the highly exothermic reaction of hydrogen and oxygen and, in the extreme case, causing catalytic ignition of hydrogen, is solved. According to the '084 patent, this undesired side reaction is suppressed when a heavy metal such as lead is added to the silver-exchanged adsorbent. The underlying zeolite compositions of the preferred materials in this patent and the previously-mentioned '850 patent are identical.

In U.S. Pat. No. 4,088,737, gaseous radioactive methyl iodide removal is further addressed in a multi-step treatment procedure where the initial gas purification is performed with a silver-exchanged zeolite exemplified by zeolite X. After iodine-compound breakthrough, regeneration and concentration steps are undertaken, which involve i) withdrawing the spent adsorbent from contact with the gaseous waste stream, ii) subjecting the adsorbent to desorption conditions with a hydrogen-rich stream to produce a hydrogen iodide containing off gas, and iii) treating this effluent gas with a lead-exchanged zeolite to re-adsorb and concentrate the desorbed hydrogen iodide. Lead-exchanged zeolite X is specifically cited as achieving the desired result for the final adsorption step. The advantage of the multi-step treatment is that the long-term storage of the contaminated material is less expensive for the lead-exchanged zeolite, compared to a silver-exchanged material.

In spite of these continuing developments and improvements in trace iodine and organic iodide removal from gaseous effluent streams, the methods employed have been found unsuitable for the more difficult problem of iodine-containing compound adsorption from corrosive liquids, such as commercial acetic acid product streams. Adsorbent carrier materials of the prior art such as zeolite X and zeolite A, which are classified as having low silica to alumina molar framework ratios (typically below 5), have experimentally been proven to be unstable in acetic acid. This means that the dissolution (or leaching) rate of framework components into the liquid is sufficiently large to render such materials ineffective for iodine-containing compound adsorption service in corrosive liquid media.

Depending on the specific silica to alumina framework molar ratio, the pentasil zeolites, exemplified in '786 patent for gas-phase iodine-containing compound removal, are significantly more stable in acetic acid than zeolite types X and A. However, the high silica to alumina framework molar ratios (20 to 50) of the preferred zeolites of the '786 patent have a significantly lower capacity for iodine-reactive metal by ion exchange than the crystalline manganese phosphate materials of the present invention. As is known in the art, increasing the silica to alumina framework molar ratio of a zeolite directionally improves its resistance to decomposition in corrosive environments, at the expense of reduced ion-exchange capacity. The reported silver loadings for the pentasil zeolite formulations in the '786 patent examples were below 10% of the total adsorbent weight. In contrast, the improved metal loadings (maximally 50% by weight) achieved by using metal-exchanged crystalline manganese phosphates result in overall greater capacity for iodine-containing compound removal, expressed in milligrams of iodine per gram of adsorbent.

Other prior-art teachings more specifically apply to iodine-compound removal from corrosive liquid media, where the principal area of concern, as described previously, is in the manufacture of carboxylic acids such as acetic acid via a process which results in a product stream contaminated with trace amounts of iodine-containing byproducts. Thus far, techniques such as adsorptive distillation, iodine scavenger addition, alkyl iodide oxidation to molecular iodine, and others have not achieved practical utility, because such methods not only fail to achieve the extremely low levels of iodine-containing compounds demanded industrially but also require additional purification steps. For this reason, far greater emphasis has been placed on the development of solid materials capable of adsorbing essentially all iodine-containing compounds from acetic acid streams.

For instance, in U.S. Pat. No. 5,457,230, the use of activated carbon fiber is contemplated for this purpose. However, the examples demonstrate the removal of molecular iodine and hydrogen iodide only and fail to specifically disclose the level of iodine-containing compounds in the treated acetic acid stream. In the case of iodine-compound removal from acetic acid, it is the ability of the invention to provide a treated product with only extremely minute levels of total iodine which primarily determines its practical utility. It is known in the art that activated carbon alone can neither remove iodine-containing compounds from commercial acetic acid streams to single parts per billion levels, nor can it effectively remove organic iodide species, such as methyl iodide and hexyl iodide which are commonly present in these product streams, without the use of an iodine-reactive metal.

Recently, considerable development efforts in acetic acid purification technology have focused on resins containing iodine-reactive metals such as silver, mercury, copper, lead, thallium, palladium or combinations of these metals known to react with iodine-containing compounds to form insoluble complexes. For example, in U.S. Pat. No. 4,615,806, the removal of these impurities is achieved with a macroreticulated strong acid cation-exchange resin which is stable in the organic medium and has at least one percent of its active sites converted to the silver or mercury form, presumably by cation-exchange. The use of macroreticulated resins is claimed as an advance over the prior art formulations, which are generally characterized as gel-type ion-exchange resins, for this service. In U.S. Pat. No. 5,139,981, other silver-exchanged resins are offered, along with a novel technique for preparing such resin compositions. In U.S. Pat. No. 5,220,058, a performance benefit is claimed, whereby the subject resin contains thiol functional groups, compared to the prior art sulfonate functional groups, which are exchanged with the iodine-reactive metal. In U.S. Pat. No. 5,227,524, the resin degree of crosslinking is decreased somewhat, resulting in improved silver utilization. In U.S. Pat. No. 5,300,685, the iodine-reactive metal is coordinated, as a salt, with a polymeric resin, rather than being ionically-bound to a cation-exchange resin. In U.S. Pat. No. 5,344,976, a resin guard bed without the iodine-reactive metal is placed upstream of the metal-exchanged resin to scavenge any metal cations in the acetic acid stream which would otherwise potentially displace the iodine-reactive metal. Finally, in U.S. Pat. No. 5,801,279, an improved method of operating the iodine-compound removal step is disclosed in order to reduce the amount of leaching of the iodine-reactive metal into the treated acetic acid effluent stream. As noted in this reference, the dissolution of the iodine-reactive metal is acknowledged as a problem for iodine-compound removal techniques of the prior art whereby metal-exchanged resins are applied.

While the invention of the U.S. Pat. No. 4,615,806 patent and other modified resin-based formulations have been used commercially with some success, resins in general suffer some disadvantages, in addition to the previously-mentioned metal loss, when used in the acetic acid environment of the present invention. More specifically, resins, even those characterized as "stable" are known to "swell" or increase in diameter by as much as 50% when exposed to an organic medium, making bed design difficult. Resins are also vulnerable to decomposition at relatively mild conditions and are furthermore susceptible to chemical attack by corrosive reagents. These factors additionally complicate the use of a resin-based material for the purification of acetic acid.

The problem therefore addressed by the present invention is to provide an adsorbent for use in removing iodine-containing compounds from commercial acetic acid feed streams where the adsorbent is free of the chemical exposure effects and swelling problems associated with the typical organic materials used in the prior art. There are significant teachings in the prior art associated with the use of non-resin adsorbents that point away from their utility in this treatment service. In particular, in the comparative example recited in U.S. Pat. No. 4,615,806 (column 6, lines 36 to 49), a silver-exchanged zeolite, characterized as 1/16 inch 5A molecular sieve pellets, was tested in acetic acid for contaminant methyl iodide removal and found to be unstable as evidenced by the continuous silver leaching from the adsorbent and the finding of a yellowish precipitate in the treated effluent. Given this discouraging result, it is remarkable that a suitable inorganic adsorbent for use in this corrosive environment has been discovered.

The adsorbent material of the present invention in fact comprises a crystalline manganese phosphate which has been cation exchanged with a metal known to react with iodine-containing compounds. The crystalline manganese phosphate composition is represented by the empirical formula:

$(A^{a+})_v(Mn^{b+})(M^{c+})_xP_yO_z$ where A is typically either an alkali or alkaline earth metal, but may also be hydronium ion, ammonium ion, organoammonium ions, silver, copper (II), zinc (II), nickel (II), mercury (II), or cadmium (II), or any combination of these species, "a" represents a weighted average valence of A and varies from about 1.0 to about 2.0, "v" is the mole ratio of A to Mn and varies from about 0.1 to about 10.0, "b" is the average valence of Mn and has a value of greater than 2 to about 4, M is (optionally) a metal selected from the group consisting of Al, $Fe^{3+}$, Ga, $Sn^{4+}$, Ti, $Sb^{5+}$, Ag, Zn, Cu, Ni, Cd, and mixtures thereof, "x" is the mole ratio of M to Mn and varies from 0 to about 3.0, "c" is the weighted average valence of M and varies from about 1.0 to about 5.0, "y" is the mole ratio of P to Mn and varies from about 0.1 to about 8.0, and "z" is the mole ratio of O to Mn and has a value determined by the equation:

$$z = \tfrac{1}{2}(a \cdot v + b + x \cdot c + 5 \cdot y).$$

Of the crystalline manganese phosphate compositions of this type, those characterized as having manganese with an average valence of greater than 3.0 but less than or equal to 4.0 are defined and described according to their unique structural details and synthesis procedures in U.S. Pat. No. 5,780,003, which is incorporated by reference. The broader range of crystalline manganese phosphate compositions applicable to the present invention include structures with manganese having an average oxidation state of greater than 2.0 but less than or equal to 4.0. All suitable materials are characterized, as described in the '003, as having an extended network. By extended network is meant that the defining Mn—P—O structural unit of the material repeats itself into at least two adjacent unit cells without termination of bonding, i.e., the material is not molecular.

The crystalline manganese phosphates of the present invention are further characterized in that they exhibit ion-exchange capacity with metals (e.g. silver) which are reactive with iodine and iodine-containing compounds. Ion-exchanged crystalline manganese phosphates alone are therefore useful as adsorbents of the present invention, but it is often desired to bind such compositions into larger particles of various shapes using an inorganic refractory metal oxide binder (e.g. silica). It is also possible to ion-exchange crystalline manganese phosphates with an effective amount of iodine-reactive metal subsequent to binding. Even after use in the iodine-containing compound adsorption service of the present invention, adsorbents comprising ion-exchanged crystalline manganese phosphate compounds can be reactivated using a relatively simple metal re-exchange procedure.

SUMMARY OF THE INVENTION

A primary object of the present invention is to provide a process for treating a liquid feed stream containing an iodine-containing compound comprising contacting the liquid stream with an adsorbent comprising a crystalline manganese phosphate which has been cation exchanged with a metal selected from the group consisting of silver, mercury, copper, lead, thallium, palladium, and mixtures thereof; at conditions effective to adsorb the iodine-containing compound on the adsorbent to yield a treated liquid stream.

A secondary object of the present invention is to provide the aforementioned process, further characterized in that the process is carried out until the adsorbent has substantially reached its adsorption capacity, at which point the adsorbent is reactivated by contacting it with a solution of a salt of a reactivation metal where the metal is selected from the group consisting of silver, mercury, copper, lead, thallium, palladium, and mixtures thereof such that an amount of reactivation metal is added to the adsorbent.

In a specific embodiment the present invention is a process for treating a liquid feed stream containing an iodine-containing compound comprising contacting the liquid stream with an adsorbent comprising silver-exchanged crystalline manganese phosphate where the silver is present in an amount of about 1 to about 50 weight percent of the adsorbent.

Other objects and embodiments are associated with the various preferred procedures and features connected with the invention and are discussed in the following detailed description.

DETAILED DESCRIPTION OF THE INVENTION

The feed for the process of the present invention can be broadly any liquid stream contaminated with one or more iodine-containing compounds. Typically, such feeds are produced in industrial processes which require the use of iodine-containing compounds to promote or catalyze the desired synthesis reaction. Well-documented examples of such reactions include the oxydehydrogenation of various inorganic materials to make the corresponding unsaturated compounds. Of utmost concern to the present invention, however, is the use of organic and inorganic iodine-containing promoters in the catalytic carbonylation of alcohols to yield the corresponding carboxylic acid.

In the specific case of modem methanol carbonylation technology, the iodine containing promoter is typically methyl iodide, lithium iodide, hydrogen iodide, or, more likely, some combination of these components. The acetic acid produced, however, will normally contain a broader range of iodine-containing compounds, including traces of $C_1$–$C_{10}$ linear and branched organic iodides as well as inorganic iodide salts of lithium and other cations either used to catalyze the reaction, formed from corrosion of the plant metallurgy, or introduced in downstream purification operations. This large variety of possible iodine-containing compounds results from the "scrambling" or recombination and rearrangement reactions of iodine-containing compounds, initially introduced as promoters, in recycle lines and processing equipment.

Normally, however, multiple distillation steps downstream of the reactor are used to separate the desired acetic acid product from unconverted reactants, catalyst promoters, and byproducts from both equilibrium and irreversible reactions. As a result of these purification measures, the predominant alkyl iodide species contaminating the acetic acid product, and thus the feed stream to the present invention, are $C_1$ to $C_8$ alkyl iodides. Also included in this feed stream are a small amount of water, generally limited to about 2000 parts per million (ppm) by weight, and trace amounts of byproduct aldehydes, alkanes, ketones, and carboxylic acids heavier than acetic acid which together normally account for less than about 100 ppm by weight of the total acetic acid stream. These other impurities do not significantly affect the ability of the adsorbent of the present invention to remove the iodine-containing compounds. In addition to the fractionation operations themselves, the injection of methanol into the first distillation column after the carbonylation reactor is commonly employed, as taught in U.S. Pat. No. 5,576,458, to further reduce the total iodine content of the acetic acid. This is achieved through the conversion of trace hydrogen iodide to methyl iodide, which is more easily separated from acetic acid by subsequent distillation steps. Using this technique combined with fractionation, typical modern industrial methanol carbonylation plants can produce acetic acid with less than about 100 ppb by weight of total iodine contamination.

Prior to contacting the iodine-compound contaminated acetic acid feed stream with the adsorbent of the present invention, pretreatment steps of the prior art other than methanol injection and fractionation may be suitable to improve the effectiveness of trace iodine-compound removal by adsorption. For example, an optional pretreatment that is within the scope of the present invention is described in U.S. Pat. No. 4,615,806 where a carbonaceous material is used specifically to remove hydrogen iodide and molecular iodine prior to the iodine-containing compound adsorption treatment. Particularly effective in this service are carbonaceous materials including activated carbons, wood charcoal, bone char, lignite, and others which may be impregnated with alkali metals known to increase the inorganic iodine compound chemisorption capacity.

Another pretreatment option, as mentioned previously, is disclosed in U.S. Pat. No. 5,344,976, whereby a cation exchange resin guard bed without any iodine-reactive metal is placed upstream of the iodine-containing compound removal adsorbent of the present invention to scavenge any metal cations, thus preventing their exposure to the adsorbent. As is well known to commercial producers of acetic acid, metal cation contamination of the product can stem from reaction catalysts and co-catalysts, corrosion of the plant metallurgy, or downstream processing operations such as neutralizing caustic injection. To effectively remove undesired cations which could otherwise potentially displace the iodine-reactive metal of the adsorbent of the present invention, a number of strong acid cation exchange resins are suitable, when used in their hydrogen form. Such resins include Amberlyst 15 (available from Rohm and Haas Company, Philadelphia, Pa.) and others, as described in the '976 patent. Depending on the specific characteristics of the acetic acid feed stream, the use of either a guard bed of carbonaceous material, cation exchange resin, or both may prove beneficial for extending the practical life of the adsorbent of the present invention.

The novel adsorbent of the present invention used to treat the iodine-compound contaminated feed comprises a crystalline manganese phosphate which has been cation exchanged with a metal that is reactive with iodine and iodine-containing compounds. Suitable crystalline manganese phosphates are represented by the empirical formula on an anhydrous basis as:

$$(A^{a+})_v(Mn^{b+})(M^{c+})_x P_y O_z$$

where A is typically either an alkali or alkaline earth metal, but may also be hydronium ion, ammonium ion, organoammonium ions, silver, copper (II), zinc (II), nickel (II), mercury (II), or cadmium (II), or any combination of these species, "a" represents a weighted average valence of A and varies from about 1.0 to about 2.0, "v" is the mole ratio of A to Mn and varies from about 0.1 to about 10.0, "b" is the average valence of Mn and has a value of greater than 2 to about 4, M is (optionally) a metal selected from the group consisting of Al, $Fe^{3+}$, Ga, $Sn^{4+}$, Ti, $Sb^{5+}$, Ag, Zn, Cu, Ni, Cd, and mixtures thereof, "x" is the mole ratio of M to Mn and varies from 0 to about 3.0, "c" is the weighted average valence of M and varies from about 1.0 to about 5.0, "y" is the mole ratio of P to Mn and varies from about 0.1 to about 8.0, and "z" is the mole ratio of O to Mn and has a value determined by the equation:

$$z = \tfrac{1}{2}(a \bullet v + b + x \bullet c + 5 \bullet y).$$

The alkali metals include lithium, sodium, potassium, rubidium and cesium, while the alkaline earth metals include magnesium, strontium and barium. Illustrative examples of organoammonium ions include but are not limited to methylammonium, ethylenediammonium, propylammonium, and hexylammonium.

When A is one structure directing agent, the weighted average valence is the valence of the one structure directing agent. However, when more than one templating agent is used, the total amount of:

$$A_v{}^{a+} = A_i{}^{ai+} + A_j{}^{aj3O} + A_k{}^{ak+} + \ldots$$

and the weighted average valence "a" is defined by:

$$a = \frac{a_i \cdot i + a_j \cdot j + a_k \cdot k + \ldots}{i + j + k + \ldots}$$

The weighted average valence of manganese ("b") is dependent on the amounts of $Mn^{2+}$, $Mn^{3+}$, and $Mn^{4+}$ present in the composition. Thus, if the total amount of manganese "w" is defined by w=p+q+r, where "p" is the mole fraction of $Mn^{2+}$, "q" is the mole fraction of $Mn^{3+}$, and "r" is the mole fraction of $Mn^{4+}$, then the average valence:

$$b = \frac{2p + 3q + 4r}{p + q + r}$$

Similarly, when two or more metals (M) are present, the amount of each metal is defined by:

$$M_x{}^{c+} = M_\alpha{}^{ca+} + M_\beta{}^{c\beta+} + M_\gamma{}^{c\gamma+} + \ldots$$

and the average valence C is determined by the equation:

$$C = \frac{C_\alpha \cdot \alpha + C_\beta \cdot \beta + C\gamma \cdot \gamma + \ldots}{\alpha + \beta + \gamma + \ldots}$$

Of the crystalline manganese phosphate compositions of this type, those characterized as having manganese with an average valence of greater than 3.0 but less than or equal to 4.0 are defined and described according to their unique structural details and synthesis procedures in U.S. Pat. No. 5,780,003, which is incorporated by reference.

The broader range of crystalline manganese phosphate compositions applicable to the present invention include structures with manganese having an average valance of greater than 2.0 but less than or equal to 4.0. All suitable materials are characterized, as described in the '003, as having an extended network. By extended network is meant that the defining Mn—P—O structural unit of the material repeats itself into at least two adjacent unit cells without termination of bonding, i.e., the material is not molecular. See "Structural Inorganic Chemistry, Fifth Edition," A. F. Wells, Clarendon Press, Oxford, pp. 11–15, (1984). The compositions can have a one-dimensional network which is a linear chain, a two-dimensional network which is a layered network or a three dimensional network which is either a microporous framework structure or a non-microporous framework structure.

Of the possible manganese phosphate compositions suitable for the method of the present invention, some have an average manganese valence below 3.0 and therefore do not fall within the scope of the '003 patent. Several of these compounds, which contain Mn(III), occur in nature, while others have been synthesized. Among the mineral phosphates containing Mn(III), only those having additionally a metallic or other ionic species with an oxidation state of +1 or +2, which can therefore be cation exchanged with an iodine-reactive metal cation, such as $Ag^+$ or $Hg^{2+}$, are applicable as adsorbents of the present invention. The following Mn(III)-containing crystalline manganese phosphate compositions have been identified as having the necessary ion exchange properties:

| | | |
|---|---|---|
| Bermanite | $Mn^{2+}(H_2O)_4[Mn^{3+}_2(OH)_2(PO_4)_2]$ | Kampf and Moore, American Mineralogist, 61, 1241 (1976) |
| Robertsite | $Ca_3Mn^{3+}_4(OH)_6(H_2O)_3[PO_4]_4$ | Moore and Ito, American Mineralogist, 59, 48 (1974) |
| Pararobertsite | $Ca_2Mn^{3+}_3(PO_4)_3O_2*3H_2O$ | Roberts et al., Can. Mineral., 27, 451 (1989) |
| Mitridatite | $Ca_6(H_2O)_6[(Fe^{3+}_{8.2}Mn^{3+}_{0.8})O_6(PO_4)_9]*3H_2O$ | Rogers and Brown, Am. Mineral., 64, 169 (1979) |
| | $KMn_2O(PO_4)(HPO_4)$ | Lightfoot et. al., J. Solid State Chem., 73, 325–329, (1988) |
| | $NH_4Mn_2O(PO_4)(HPO_4)*H_2O$ | Lightfoot et. al., J. Solid State Chem., 78, 17–22, (1989). |
| | $LiMn(PO_4)(OH)$ | Aranda et. al., Angew. Chem. Int. Ed. Engl, 31, 1090–1092, (1992). |
| | Mn(III) pyrophosphates, e.g., $NH_4MnP_2O_7$ | Lee et. al., J. Chem. Soc. (A), 559–561, (1968) |

More information on Mn(III)-containing minerals, especially structure, can be found in the review by Hawthorne in Z. Kristallogr., 192, 1 (1990)

Other types of crystalline manganese phosphates where the average manganese valence varies from greater than 2.0 to 3.0 are prepared by hydrothermal crystallization of a reaction mixture prepared by combining reactive sources of phosphorus, manganese, optionally one M metal, at least one structure directing agent (A) plus water. Specific examples of the phosphorus sources which can be used in this invention are orthophosphoric acid, pyrophosphoric acid, alkali phosphates and sodium metaphosphate. The manganese source can be either a high oxidation state salt such as $KMnO_4$, $NaMnO_4$, $CsMnO_4$, $NH_4MnO_4$, $Mg(MnO_4)_2$ and $Ba(MnO_4)_2$. Other sources of manganese are birnessite and buserite. Birnessite, e.g., $Na_4Mn_{14}O_{27}*9H_2O$, and a more hydrated form called buserite are layered manganese oxides which contain charge balancing cations and water between the layers. The valence of Mn in these materials is about +3.3 to about +3.7. These materials can be prepared in a variety of cation forms such as $Li^+$, $Na^+$, $K^+$, $Rb^+$, $Cs^+$ and $NH_4^+$ where the cations are present between the layers. These cations can be partially or totally exchanged with other cations such as $Ag^+$, $Hg^{2+}$, $Cu^{2+}$, $Pb^{4+}$, $Tl^{3+}$, $Pd^{2+}$, or mixtures thereof, known to be reactive with iodine-containing compounds and therefore suitable for the adsorbent of present invention.

The layers can also be expanded with organoammonium cations via an initial treatment in acid followed by a treatment with an amine. A variety of amines including propylamine may be employed for the purpose of creating reactive expanded birnessites for use in making the new manganese phosphates having a valence of greater than 2 to 3.0. More details on preparing expanded birnessites can be found in Wong and Cheng, Inorg. Chem., 31, 1165–1172. These sources of manganese oxide are very reactive and easily transformed to other structures. The Mg-exchanged version of bimessite can be structurally transformed hydrothermally to form the microporous manganese oxide todorokite, Y. Shen et al., Science, 260, 511–515 (1993). The various forms of bimessite and buserite are hydrothermally transformed in the presence of excess phosphate, where phosphate can engage in bonding with the manganese oxide while structural transformations occur. The valence of Mn in the resulting compounds is usually +3 or less, depending on pH, temperature, and the nature of A.

Manganese sources can also be any layered manganese oxide pillared with a variety of organoammonium cations such as methylammonium, ethylammonium, propylammonium, butylammonium, hexylammonium, ethylenediammonium, tetramethylammonium and mixtures thereof. Additionally, 1,4 diazabicyclo [2.2.2] octane (DABCO) alone or in combination with organoammonium cations such as enumerated above can also be used. Combinations of ammonium cation and any organoammonium cations (and/or DABCO) can also be used. The series of layered manganese (IV)-containing phosphates, examples of which are described as NaMnP-1a and NaMnP-1b in U.S. Pat. No. 5,780,003, in their various metal substituted (for manganese) and cation exchanged forms, also can be used as sources of manganese for preparing the manganese phosphates of this invention.

Finally, it is preferred to use a special manganese solution prepared from $NaMnO_4$ and $H_3PO_4$ whose preparation is described in detail in Example 1 of U.S. Pat. No. 5,780,003. This phosphate-stabilized manganese solution has a composition represented by the empirical formula:

$$NaMnO_4:rH_3PO_4:sR:uH_2O$$

where R is a reductant selected from the group consisting of $H_2C_2O_4$, $Na_2C_2O_4$, $NaHCO_2$ and $Mn(NO_3)_2*6H_2O$, "r" has a value of about 3.0 to about 30, "s" is the mole ratio of R:$NaMnO_4$ sufficient to reduce the manganese oxidation state to a value of greater than 3 to about 4 and varies from about 1.5 to about 4, and "u" is the moles of water and varies from about 25 to about 1000 in order to vary the manganese concentration from 0.1 wt. % to about 5 wt. %. The preferred form of this solution contains 1 wt. % manganese and is called the "1% Solution" in the rest of this application. The advantage to this solution is that it is stable over a long period of time, i.e., months, and facilitates the preparation of the instant compositions by adding a templating agent, such as an organoammonium salt or amine, or alternatively an alkali metal or alkaline earth in combination with a suitable portion of reductant to this solution and heating the resultant mixture. This solution is especially convenient with the organoammonium cations and amines because these structure directing agents react uncontrollably with other soluble high oxidation state Mn salts, such as the permanganates ($MnO_4^-$) listed above. Substituent metals, such as Al, Fe, and others may also be introduced into this solution and aged before the appropriate crystallization inducing agents are added. Using this solution and suitable reductants, it is possible to prepare a variety of Mn (III) and mixed valence Mn(III)/Mn(II) phosphates. Examples of reductants include but are not limited to amines and organoammonium species, which also serve as the charge-balancing species for the manganese phosphate framework. In this process, the original amine or organoammonium species will be partially oxidized, often resulting in the formation of fragments of the original amine or organoammonium species. Hence, the charge-balancing species for the manganese phosphate framework may be one of these fragments or a mixture thereof and different from the original amine or organoammonium species introduced into the synthesis mixture. Because of this, the elemental analyses will often yield non-integral carbon/nitrogen ratios for the organoammonium groups. Other reductants include inorganic or organoammonium formates and oxalates and various chloride salts.

Another method to prepare the manganese phosphates of this invention is via the hydrothermal treatment of $MnPO_4*H_2O$ or its metal-substituted forms in alkaline solutions. The alkaline solutions may be formed by alkaline hydroxides, organoammonium hydroxides, ammonium hydroxide, or a variety of amines. The manganese(III) phosphate $MnPO_4*H_2O$ used for these reactions is easily prepared by reacting excess concentrated phosphoric acid with nitric acid and Mn $(NO_3)2*4H_2O$ and isolating the $MnPO4*H_2O$ product.

Yet another way to make these novel manganese phosphates is to use a "trapping" method in which the desired manganese oxidation state is generated in the presence of excess phosphate via a redox reaction. For example, the soluble manganate $MnO_4^-$ is dissolved in a solution containing excess phosphoric acid and is reduced using a reducing agent such as formate or oxalate salts. The purpose of the excess phosphate is to avoid the formation of insoluble manganese oxides in the +3 and +4 oxidation states and insure that a manganese phosphate forms instead Hence, as the typically insoluble oxidation states of manganese are formed, they are "trapped" and stabilized by the excess phosphate.

The non-manganese sources must be chosen in a manner such that the source, the digestion temperature, and the pH will yield manganese phosphates with oxidation states greater than 2+, but less than or equal to 3.0. Not every source enumerated in the following list is compatible with every source of manganese with respect to attaining the desired manganese oxidation state. Thus, the source of structure directing agents are as follows. The source of the alkali or alkaline earth metals include the acetate, nitrate, carbonate, and hydroxide compounds. Specific examples include sodium chloride, sodium nitrate, sodium acetate, sodium carbonate, sodium hydroxide, lithium chloride, lithium nitrate, lithium carbonate, lithium hydroxide, rubidium chloride, rubidium nitrate, rubidium carbonate, rubidium hydroxide, cesium chloride, cesium nitrate, cesium carbonate, cesium hydroxide, potassium chloride, potassium nitrate, potassium carbonate, potassium hydroxide, magnesium chloride, magnesium nitrate, magnesium carbonate, magnesium hydroxide, barium chloride, barium nitrate, barium carbonate, barium hydroxide, strontium chloride, strontium nitrate, strontium carbonate and strontium hydroxide. Sources of organoammonium ions include methylamine, hexylamine, propylamine, and ethylenediamine. The organoammonium cation is generated in situ via protonation. Organoammonium cations may also be quaternized, such as tetramethylammonium and tetraethylammonium, employed as either hydroxides or chlorides. Finally, sources of the M metal include the nitrate salts of the metals as well as $TiCl_3$, $NaSbF_6$, and $SnCl_4$.

Generally, the hydrothermal process used to prepare these manganese phosphates involves forming a reaction mixture which has the formula:

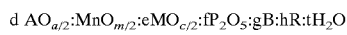

$d\ AO_{a/2}:MnO_{m/2}:eMO_{c/2}:fP_2O_5:gB:hR:tH_2O$ where B is a mineralizer, R is a reductant, "d" ranges from about 0.5 to about 20, "e" ranges from 0 to about 3.0, "f" ranges from about 0.5 to about 15, "g" ranges from 0 to about 2, "h" ranges from 0 to about 5, "t" ranges from about 25 to about 1000, and "m" ranges from about 3 to about 7. Examples of the mineralizer B include HF and NaF, while examples of the reductant R include $NaHCO_2$, $H_2C_2O_4$, and $Na_2C_2O_4$.

It also is necessary to adjust the pH of the mixture to a value of about 2.0 to about 12.0. The pH of the mixture can be controlled by addition of a base such as NaOH, $NH_4OH$, amines, etc.

Having formed the reaction mixture, it is next reacted at a temperature of about 50° C. to about 175° C. for a period of about 12 hours to about 240 hours. The reaction is carried out under atmospheric pressure or the reaction vessel may be sealed and the reaction run at autogenous pressure. In a preferred method the phosphorus source and the manganese source is the "1% solution", the temperature is from about 70° C. to about 100° C. and the time required to crystallize the product is from about 16 hours to about 120 hours.

It should be pointed out that not all the enumerated structure directing agents can provide all the various structures possible in the generic class of extended network manganese phosphate compositions. The relationship of specific structure directing agents to individual products is apparent from the illustrative examples set forth in the previously-mentioned '003 patent. Likewise, the manganese oxidation state measurement, elemental analysis, and structural characterization of the manganese phosphate compositions used in the adsorbent of the present invention are discussed in detail in the '003 patent and will not be repeated here.

As explained previously, the utility of crystalline manganese phosphate compositions for the present invention is based on their stability in corrosive environments. A simple test to determine whether any particular crystalline manganese phosphate is sufficiently stable comprises subjecting it to the liquid feed to which it would normally be exposed in its adsorptive service at the proposed operating temperature for 24 hours. Any substantial dissolution of the solid crystalline manganese phosphate appears as a brown color in the solution.

Crystalline manganese phosphates of the type of the present invention can be activated by suitable ion exchange with any metal known to be reactive with iodine- containing compounds. Particularly, ion exchange with silver, mercury, copper, lead, thallium, palladium or mixtures thereof gives good results for use in liquid-phase iodine compound adsorption service. As noted previously, crystalline manganese phosphate starting materials contain, in addition to manganese, phosphorous, and an optional metal; a metallic or other ionic species having an oxidation state of +1 or +2 which can be exchanged with any of the aforementioned iodine-reactive metals. For example, the crystalline potassium manganese phosphate KMnP-P, as described in the '003 patent, can be silver exchanged to yield substantially AgMnP-P which is suitable for use as an adsorbent of the present invention.

For converting the initial sodium, potassium, ammonium, or hydrogen form or any other form of the crystalline manganese phosphate starting material into the metal-exchanged form suitable for use in the present invention, any water-soluble salt of the metals recited above is appropriate as an ion-exchange medium. Also, a non-aqueous organic medium may be used provided sufficient solubility of the salt is possible. Acetate, nitrate, or halide salts are ordinarily used for the ion-exchange procedure and the appropriate conditions are typically from ambient temperature to about 30° C. and atmospheric pressure. The contact of cation-rich solutions with the crystalline manganese phosphate can be repeated to obtain a desired metal loading. In some cases, drying the material between ion-exchange treatments may improve penetration of the metal into the crystalline manganese phosphate material. After completion of the ion-exchange step, it is necessary to dry the ion-exchanged material at about 80° C. to about 150° C. for at least one hour to remove any residual solution.

For the application of the present invention, the most preferred metal for ion exchange is silver, with best results achieved when the silver loaded represents about 1% to about 50%, preferably about 10% to about 40% on an elemental basis, of the dried adsorbent weight. Because the manganese phosphate is typically precipitated from solution as small crystallites, it is often desired to bind this material into larger particles such as pellets, extrudates, or spheres. For such cases, the ion-exchange procedure can be applied directly to the crystallites prior to binding. Alternatively, it is possible to incorporate the metallic cation into the crystalline manganese phosphate structure after binding it into a particle suitable for a commercial packed-bed system. Typically, the crystal size of manganese phosphate starting material is 0.1 to 6 microns but the crystallites are agglomerated into particles of 10 to 100 microns in diameter. In contrast, particles useful for fixed-bed applications have diameters of about 1600 microns, although their exact size is not critical, provided the bed pressure drop is acceptable in commercial operation. It is to be noted that the crystalline manganese phosphate alone may be formed into various shapes large enough so that, for the practical purposes of the present invention, a separate binding agent may not be necessary.

In the prior art, there are many ways described for combining a binder material with zeolites to make larger-size particles with sufficient strength suitable for the present invention. These procedures are in general also applicable to the binding of crystalline manganese phosphates and are described in greater detail here as well as in the specific preparation examples which follow. It is, of course, necessary that the binder material is not soluble to any significant degree in the corrosive liquid feed stream to be treated. The test for the appropriate degree of insolubility is a finding of below about 10 ppm of the binder material in the treated effluent stream of the present invention under iodine-compound adsorption conditions after 100 hours. The initial 100 hours provides a reasonable period for the adsorbent to stabilize and reach its start-of-run composition.

Binder materials found to satisfy the substantial insolubility requirement and exhibit utility in preparing the bound crystalline manganese phosphate adsorbents of the present invention are the inorganic metal oxides selected from the group consisting of silica, titania, zirconia, chromia, vanadia, and mixtures thereof. Preferred binder materials are selected from the group consisting of silica, titania, zirconia, and mixtures thereof. Silica, in addition to its stability in corrosive media, is most preferred in practice because of its ready availability and low cost. Binder materials such as alumina which are susceptible to attack in acidic solutions are not suitable.

If it is determined that shaped agglomerates of the crystalline manganese phosphate and binder material are to be formed, an extrusion procedure is commonly incorporated. In the first step, a starting solution of the metal, which will ultimately become the metal oxide binder after the proper drying and firing (calcining) steps are employed, is prepared. In the case where titania or zirconia binders are used, for example, the preferred starting solutions are titanium isopropoxide or zirconium acetate, respectively. To cause the necessary formation a gel from the starting solution, the addition of a base such as aqueous sodium hydroxide may or may not be required. Once formed, the gel is then blended with the crystalline manganese phosphate powder in the proper ratio, according to the desired binder content in the final adsorbent. The resulting mixture is mulled, together with water and a lubricant (or extruding agent) such as glycerin to form a dough which can then be extruded into particles most commonly having a circular cross section. It is certainly possible to form other cross sectional shapes; the main objective is to reduce the gross diffusional path of iodine-containing contaminants into the adsorbent pores, which are the molecular channels of the crystalline manganese phosphate. Typically, pellet, pill, or extrudate forms are used.

If spherical adsorbent agglomerates are desired, the preferred method of forming is according to the well-known "oil-dropping" technique. This procedure essentially involves the initial synthesis of an appropriate sol, or carrier material, of the binder used for suspending the active crystalline manganese phosphate material. Details of this technique are provided in U.S. Pat. No. 2,620,314, which is incorporated by reference. In the case of the preferred binders mentioned for producing the adsorbent material of the present invention, it is appropriate to make an acidic hydrosol that can be gelled using the type of temperature-activated gelling agent set forth in the '314 patent. The preferred temperature-activated gelling agent is hexamethylenetetramine (HMT). It is also recognized that in some cases silica sols may gel without a gelling agent or even a substantial change in temperature. It should be noted that the use of a gelling agent, combined with the general conditions suitable for oil dropping, will result in a final bound adsorbent where the average manganese oxidation state is less than 3, even when this value is above 3 in crystalline manganese phosphate starting material. The use of this oil-dropping technique to bind crystallites and form spherical agglomerates is also within the scope of the present invention.

Types of silica sols used to form the silica binder are commercially available as aquasols or organosols containing dispersed colloidal silica particles. For performing oil dropping with a silica sol, an inverted silica sol, produced by an acid addition technique and a basic gelling agent such as a mixture of urea and HMT, is preferred. When a zirconia binder is used for the adsorbent preparation, the preferred acidic sol is an aqueous zirconium acetate and urea solution.

The important feature of the technique for forming agglomerates is to avoid any significant binder blockage of the crystalline manganese phosphate pores by the sol. In the case of the present invention, this phenomenon, called "binder blinding", would cause binder interference with access of the iodine-containing compounds to the active sites in the crystalline manganese phosphate. To overcome this effect, it may be necessary to add an inert diluent, typically of somewhat smaller size than the crystalline manganese phosphate particles, to the mixture of manganese phosphate and binder prior to agglomerate formation. This diluent can act as a bridging material for the binder and crystalline manganese phosphate, thus preserving the crystallite pore system. Typical inert diluents used to prevent binder blinding are non-colloidal silica and some types of clays resistant to low pH conditions. An essential feature of the present invention, of course, is that the chemical characteristics of the binder are properly matched with those of the crystalline manganese phosphate, if such a bound material is in fact used. Regardless of the method of agglomerate formation, the resulting particles should be dried at about 80° C. to about 150° C. for at least one hour and then calcined in dry air.

Typically, the initial forming stage in the production of bound pellets, pills, extrudates or other shapes yields "green" particles which posses sufficient strength for a subsequent calcination step to set the binder and activate the crystalline manganese phosphate. The temperatures appropriate for this calcination or firing step range from about 250° C. to about 500° C., preferably from about 300° C. to about 400° C. The exposure of crystalline manganese phosphates to higher temperatures for extended periods can cause degradation of the crystalline structure. The binder is usually present in an amount of less than about 40% by weight of the binder and crystalline manganese phosphate combined.

According to the present invention, the liquid feed stream contaminated with iodine-containing compounds is contacted with an adsorbent comprising a crystalline manganese phosphate exchanged with metallic cations, which are reactive with the iodine-containing impurities. A binder material may or may not be necessary, depending on the specific type of crystalline manganese phosphate and process conditions used. The adsorption conditions applicable to the present invention include an absolute pressure at least sufficient to maintain the feed stream as a liquid. In most cases, this absolute operating pressure is about 0.5 to about 10 atmospheres (about 51 to about 1010 kPa), preferably about 1 to about 5 atmospheres (about 101 to about 505 kPa) at a temperature from about 20° C. to about 60° C., preferably from about 30° C. to about 40° C. In general, higher temperatures improve the interaction of the iodine-containing contaminants with the reactive metal which is deposited onto the adsorbent and thereby increase the utilization of the reactive metal sites. A suitable liquid hourly space velocity (LHSV) is in the range from about 0.5 to about 15 $hr^{-1}$, preferably from about 1 to about 10 $hr^{-1}$. As understood in the art, the LHSV is the hourly volumetric liquid feed flow rate divided by the adsorbent volume and represents the reciprocal of the average time of the liquid within the adsorbent bed.

After an extended period of operation in iodine-compound removal service the iodine-reactive metal is gradually converted to its metal iodide. Concurrently, the crystalline manganese phosphate metal-exchange sites, previously occupied by the iodine-reactive metal, are changed to their hydrogen form. Electron microscopy analysis of silver-exchanged, bound zeolitic adsorbents after use has indicated a migration of silver iodide molecules and subsequent agglomeration at various points on the outer surface of the adsorbent. Similar behavior is expected for bound crystalline manganese phosphate compositions in the same service. As substantially all of the iodine-reactive metal is converted to metal iodide, the adsorbent gradually loses its effectiveness, so that the treated liquid stream may no longer conform to the product quality specifications demanded in terms of total iodine content. At this point, the adsorbent has substantially reached is adsorption capacity and a simple metal exchange procedure can restore activity.

The technique requires subjecting the adsorbent, either in situ or ex situ, to a solution of iodine-reactive metal cations, preferably the same type of solution used originally for the cation-exchange procedure. The ion-exchange treatment introduces an additional portion of the active metal, thereby reestablishing the metal-exchanged crystalline manganese phosphate sites active for iodine-containing compound adsorption. Thus, the adsorbent activity for iodine-compound removal is restored. The amount of metal added in this reactivation treatment is preferably about 0.5 to about 1.5 of the amount originally deposited onto the carrier, with the specific quantity determined by the extent of deactivation of the adsorbent activity. The reactivation procedure can be repeated multiple times to vastly extend the adsorbent life, until the active crystalline manganese phosphate metal-exchange sites become obstructed with silver iodide to such an extent that more severe treatment steps are necessary to restore the iodine-containing compound adsorption capacity.

Within the scope of the present invention, it is possible to pass the treated liquid effluent, which has been depleted in iodine-containing compounds to less than 10 and preferably less than 5 ppb (measured as total elemental iodine) by weight, over a second bed of the adsorbent, in which the crystalline manganese phosphate component has not been cation-exchanged with an iodine-reactive metal. This serves to recover or "trap" any metallic cations originally present in the first bed of the metal-exchanged crystalline manganese phosphate-containing adsorbent which were released into the treated liquid due to displacement by hydrogen ions or metallic cation contaminants in the liquid feed stream during the adsorption step. This procedure would therefore ensure that cations released from the adsorbent during the treatment method of the present invention are retained within the system and consequently do not contaminate the effluent liquid.

It is, of course, also within the scope of the present invention to periodically reverse the flow through the aforementioned two bed system to drive an active mass-transfer zone of metallic iodine-reactive cations from one bed to the other, thereby making them continually available for adsorption of the iodine-containing compounds in the liquid feed. Details associated with the operation of such a two-bed system are well known to those skilled in the art. To scavenge any cations, including those used for adsorption of iodine-containing compounds, exiting with the liquid effluent of the treatment step of the present invention, it is also possible to use any suitable commercial product selective for the adsorption of cations. Especially preferred for this service are cation exchange resins such as Amberlyst 15 in the hydrogen form.

The adsorption step can be performed using a fixed-, moving-, or fluidized-bed system or a batch operation. It is preferred to employ a fixed-bed system with the iodine-containing compound contaminated liquid feed stream continually flowing through the adsorption zone of active adsorbent. Of course, the adsorption step may use a plurality of adsorption zones with the desired conditions maintained between and within the separate beds. In any case, depending on iodine-compound concentration in the liquid feed stream, the operating conditions of the adsorption step can be manipulated to achieve an effluent liquid stream containing less than about 10 ppb by weight of total iodine, calculated on an elemental basis, and preferably less than about 5 ppb by weight. Regarding the mechanics of the operation, it is possible to use swing-bed systems of the prior art to alternate beds of adsorbent between the adsorption and reactivation steps of the present invention.

The following specific examples are provided to illustrate and clarify, but not the present invention.

COMPARATIVE EXAMPLE 1

The Comparative Example III of U.S. Pat. No. 4,615,806 (column 6, lines 35 to 49), is incorporated for reference. According to this comparative example, an attempt was made to remove methyl iodide from an essentially pure acetic acid stream utilizing 50 ml of 1/16 inch (1.6 mm) particle size 5A molecular sieve pellets. This non-resin carrier material contained unspecified amounts of zeolite A which had been ion exchanged with silver from a silver nitrate solution. A synthetic solution of 0.865% methyl iodide in acetic acid was then passed over this bed of silver-exchanged 5A molecular sieve particles at apparently ambient temperature and pressure at an LHSV of 1 hr$^{-1}$. Continuous leaching of silver was noted, along with the formation of a yellowish precipitate in the treated acetic acid effluent, which was believed to be silver iodide. These results would imply that breakthrough of the methyl iodide occurred very quickly and therefore that performance was unacceptable.

COMPARATIVE EXAMPLE 2

An adsorbent comprising zeolite X (defined in U.S. Pat. No. 2,882,244) in a powder size of 0.1 to 6 microns was bound with a kaolin-type clay to make agglomerates ranging in diameter from 150 to 840 microns. The amount of zeolite X used in this preparation resulted in uncalcined agglomerates having 80% zeolite by weight. These agglomerates were then dried at 75° C. for 3 hours and calcined in dry air at a final temperature of 600° C. for 4 hours. The calcined adsorbent particles were soaked in an aqueous solution of silver nitrate until sufficient silver had been cation exchanged with zeolite X to result in particles containing 10.5% silver by weight in the form of exchanged silver cation. The silver-exchanged particles were water washed to remove residual exchange solution and then dried at 300° C. for 2 hours. The final resulting adsorbent had a silica to alumina framework molar ratio of 2.5, a silver content of 10.5% by weight and an ABD (apparent bulk density) of about 0.7 grams per milliliter.

A breakthrough test was then performed to determine the capacity of this adsorbent containing silver-exchanged zeolite X for adsorption of methyl iodide from an acetic acid solution. A feed solution containing about 500 ppm methyl iodide in acetic acid was passed through a 50 ml packed bed containing these adsorbent particles. The iodine-containing compound adsorption conditions included an LHSV of 4 hr$^{-1}$, an absolute pressure of 6.8 atmospheres, and a temperature of 60° C.

Almost immediately, the effluent from the test zone turned cloudy and a precipitate formed. Upon analysis the precipitate was found to contain silver iodide, indicating that iodide breakthrough occurred very early in the run. In addition, the effluent showed a substantial content of alumina, a symptom of zeolite framework breakdown as well as binder degradation and leaching. Performance was unacceptable.

EXAMPLE 1

Crystalline potassium manganese phosphate was prepared according the following procedure, which is also described in general in U.S. Pat. No. 5,780,003:

Potassium permanganate, 237.06 grams, was dissolved in 4200 grams of de-ionized water in a 12-liter flask. To this mixture, 1729 grams of concentrated (85% by weight) phosphoric acid were added, and the sides of the flask were then washed with an additional 123 grams of de-ionized water. The contents of the flask were stirred for about 30 minutes using a mechanical agitation device.

A potassium formate solution was prepared by dissolving 205.03 grams of solid KHCO$_2$ in 550 grams of de-ionized water. This liquid was added drop wise to the well-mixed potassium permanganate, phosphoric acid solution. There was some carbon dioxide evolved during the addition. When the addition of the formate solution was completed, the solution was allowed to stir for an additional 2 hours to ensure carbon dioxide evolution was complete.

A separate solution of potassium hydroxide was then prepared by dissolving 679.2 grams of solid KOH in 2000 g de-ionized water. This solution was added drop wise to the reaction mixture described above, while continuous stirring was maintained, to ultimately yield a black-brown suspension. A condenser was then attached to the flask and the resulting mixture was refluxed for 38 hours. The dark red-brown product was subsequently filtered from a colorless mother liquor and washed thoroughly with de-ionized water. The solid was left to dry overnight at 120° C.

Characterization via x-ray powder diffraction, as described according to U.S. Pat. No. 5,780,003 (column 6, lines 7 to 28), showed that the solid had the pharmacosiderite structure. Elemental analysis of the potassium manganese phosphate composition showed the material had the approximate stoichiometry $K_{2.51}Mn_{4.00}P_{2.96}O_{16}$.

Silver-exchanged manganese phosphate was then prepared by ion exchange of the potassium manganese phosphate powder with silver nitrate solution. In this case, 33.0 grams of the potassium manganese phosphate solid was suspended in a silver nitrate solution, prepared by dissolving 40.44 grams of silver nitrate in 500 grams of de-ionized water. The suspension was stirred for 24 hours at room temperature, filtered, washed thoroughly with de-ionized water, and dried at room temperature. The resulting material was found to contain 28.5% silver by weight and have the composition $Ag_{2.57}K_{0.20}Mn_{4.00}P_{3.00}O_{16}$ (water-free basis). A second silver exchange increased the silver content to 34.4% by weight and the resulting compositional analysis corresponded to $Ag_{3.08}K_{0.002}Mn_{4.00}P_{2.79}O_{16}$ (water-free basis). Apparently, an additional increment of silver was exchanged upon offering a second silver cation-rich solution. For practical purposes, however, a single silver-exchange, having resulted in about 93% efficiency, was determined to be sufficient. The silver content was measured using atomic adsorption spectroscopy (AAS) analysis.

In a batch experiment, 0.58 ml (0.30 grams) of the silver-exchanged manganese phosphate was contacted with a 4 gram sample of acetic acid which had been contaminated with 400 ppm of iodine as methyl iodide at ambient temperature and pressure. After the slurry was allowed to equilibrate for 16 hours, the solid was filtered and the acetic acid was analyzed for total iodine using gas chromatography (GC) equipped with an Electron Capture Detector (ECD). Results showed that after this single stage of separation, the iodine concentration in the liquid phase was reduced to only 10.7 ppb. The calculated iodine-containing compound adsorption capacity of the silver-exchanged manganese phosphate was therefore 2.8 milligrams of iodine per milliliter of adsorbent.

EXAMPLE 2

An aqueous solution of zirconium acetate (Aldrich Chemical Company, Inc., Milwaukee, Wis.), containing 15% zirconium by weight, was mixed with 42.5 grams of 10% by weight NaOH to cause the formation of a soft gel. The gel was allowed to stand for 20 minutes. Extrudates were then prepared by mulling a mixture of this gel, 6 grams of glycerin, and 111 grams of crystalline manganese phosphate powder (containing about 5% water by weight). The crystalline manganese phosphate powder was potassium manganese phosphate which had been silver-exchanged, according to the procedure described in Example 1, to yield primarily silver manganese phosphate. The duration of the mulling was 45 minutes, at which point 10 grams of water were added to the mixture. Mulling continued an additional 10 minutes. The resulting "dough" was then extruded with a screw-type extruder and the cylinder-shaped particles were dried at 100° C. for two hours and calcined at 325° C. in dry air. The final adsorbent product contained 35% zirconia binder and 65% silver-exchanged crystalline manganese phosphate by weight.

Using 9 ml of this bound, silver-exchanged crystalline manganese phosphate, a breakthrough test was performed to determine its capacity for adsorption of methyl iodide from an acetic acid solution. The liquid feed stream in this experiment comprised acetic acid which was contaminated with methyl iodide in amounts ranging from 449 to 577 ppm, measured as total iodine by GC-ECD analysis. Variations in the level of iodine contamination were due to differences in the preparation of new stock solutions as they were consumed in the course of the test. The adsorbent particles were packed into a 10 mm i.d. column, through which the liquid feed was passed continuously. The iodine-containing compound adsorption conditions included an LHSV of 4 $hr^{-1}$, ambient pressure, and a temperature of 60° C.

During the 4 days of testing, several effluent samples of the treated acetic acid were analyzed for total iodine, and none showed more than 1.7 ppb of contamination. Using the exact experimental duration and iodine levels in the feed stream, the adsorption capacity was calculated to be 52.9 mg of iodine per milliliter of adsorbent.

What is claimed is:

1. A process for treating a liquid feed stream containing an iodine-containing compound comprising contacting the liquid feed stream with an adsorbent comprising a crystalline manganese phosphate which has an extended network and a composition on an anhydrous basis expressed by an empirical formula of:

$$(A^{a+})_v(Mn^{b+})(M^{c+})_x P_y O_z$$

where A is selected from the group consisting of alkali metals, alkaline earth metals. hydronium ion, ammonium ion, organoammonium ions, silver, copper (II), zinc (II), nickel (II) mercury (II), cadmium (II), and mixtures thereof, "a" represents a weighted average valence of A and varies from 1.0 to 2.0, "v" is the mole ratio of A to Mn and varies from about 0.1 to about 10.0, "b" is the average valence of Mn and has a value of greater than 2 to about 4, M is a metal selected from the group consisting of Al, $Fe^{3+}$, Ga, $Sn^{4+}$, Ti, $Sb^{5+}$, Ag, Zn, Cu, Ni, Cd, and mixtures thereof, "x" is the mole ratio of M to Mn and varies from 0 to about 3.0, "c" is the weighted average valence of M and varies from about 1.0 to about 5.0, "y" is the mole ratio of P to Mn and varies from about 0.1 to about 8.0, and "z" is the mole ratio of O to Mn and has a value determined by the equation:

$$z=\tfrac{1}{2}(a\bullet v+b+x\bullet c+5\bullet y), \text{ and}$$

the crystalline manganese phosphate further has been cation exchanged with a metal selected from the group consisting of silver, mercury, copper, lead, thallium, palladium, and mixtures thereof; at conditions effective to adsorb the iodine-containing compound on the adsorbent to yield a treated liquid stream.

2. The process of claim 1 where the crystalline manganese phosphate is mixed with an inorganic refractory metal oxide binder.

3. The process of claim 2 where the binder is selected from the group-consisting of silica, titania, zirconia, chromia, vanadia, and mixtures thereof.

4. The process of claim 1 where the metal is silver and is present, on an elemental basis, in an amount from about 1 to about 50 weight percent of the adsorbent.

5. The process of claim 1 where the iodine-containing compound is an alkyl iodide having 1 to 8 carbon atoms.

6. The process of claim 1 where the adsorption conditions include a temperature from about 30° C. to about 40° C., pressure from about 1 to about 5 atmospheres, and a liquid hourly space velocity from about 1 to about 10 $hr^{-1}$.

7. The process of claim 1 where the treated liquid stream contains less than about 10 parts per billion of total iodine by weight.

8. The process of claim 1 where the liquid feed stream comprises an acetic acid feed stream.

9. The process of claim 1 further characterized in that the process is carried out until the adsorbent has substantially reached its adsorption capacity, at which point the adsorbent is reactivated by contacting it with a solution of a salt of a reactivation metal where the metal is selected from the group consisting of silver, mercury, copper, lead, thallium, palladium, and mixtures thereof such that an amount of reactivation metal is added to the adsorbent.

* * * * *